United States Patent
Yamaguchi

(10) Patent No.: US 9,595,718 B2
(45) Date of Patent: Mar. 14, 2017

(54) LITHIUM SECONDARY BATTERY AND METHOD FOR PRODUCING SAME

(71) Applicant: TOYOTA JIDOSHA KABUSHIKI KAISHA, Toyota-shi, Aichi (JP)

(72) Inventor: Hiroyuki Yamaguchi, Susono (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 14/419,682

(22) PCT Filed: May 27, 2013

(86) PCT No.: PCT/JP2013/064656
§ 371 (c)(1),
(2) Date: Feb. 5, 2015

(87) PCT Pub. No.: WO2014/027492
PCT Pub. Date: Feb. 20, 2014

(65) Prior Publication Data
US 2015/0188142 A1    Jul. 2, 2015

(30) Foreign Application Priority Data
Aug. 16, 2012 (JP) ................... 2012-180466

(51) Int. Cl.
| | |
|---|---|
| *H01M 4/62* | (2006.01) |
| *H01M 4/505* | (2010.01) |
| *H01M 4/04* | (2006.01) |
| *H01M 4/525* | (2010.01) |
| *H01M 10/0525* | (2010.01) |
| *G10L 13/08* | (2013.01) |
| *G10L 13/10* | (2013.01) |

(52) U.S. Cl.
CPC ............. *H01M 4/628* (2013.01); *G10L 13/08* (2013.01); *G10L 13/10* (2013.01); *H01M 4/0402* (2013.01); *H01M 4/505* (2013.01); *H01M 4/525* (2013.01); *H01M 10/0525* (2013.01); *H01M 2220/20* (2013.01); *Y02E 60/122* (2013.01)

(58) Field of Classification Search
CPC .... H01M 4/628; H01M 4/505; H01M 4/0402; H01M 4/525; H01M 10/0525
USPC ........................................................ 429/212
See application file for complete search history.

(56) References Cited

U.S. PATENT DOCUMENTS

| | | | |
|---|---|---|---|
| 5,631,106 A * | 5/1997 | Dahn ...................... | H01M 4/58 423/594.15 |
| 6,235,431 B1 | 5/2001 | Takechi et al. | |

(Continued)

FOREIGN PATENT DOCUMENTS

| | | |
|---|---|---|
| JP | 3348344 B2 | 11/2002 |
| JP | 2010-086681 A | 4/2010 |
| KR | 10-2008-0076813 A | 8/2008 |

*Primary Examiner* — Karie O'Neill Apicella
(74) *Attorney, Agent, or Firm* — Sughrue Mion, PLLC

(57) ABSTRACT

The present invention provides a lithium secondary battery using a lithium transition metal composite oxide as a positive electrode active material. The lithium secondary battery is constituted with a negative electrode on and/or around which a cyclic silazane-based compound and/or a reaction product thereof are present. The cyclic silazane-based compound comprises a Si—N bond in the ring constituting the cyclic silazane-based compound and also has at least one vinyl group.

10 Claims, 3 Drawing Sheets

(56) References Cited

U.S. PATENT DOCUMENTS

2006/0177739 A1* 8/2006 Endo .................... H01M 4/485
                                                    429/231.95
2008/0206651 A1   8/2008 Kawase et al.

* cited by examiner

LITHIUM SECONDARY BATTERY AND METHOD FOR PRODUCING SAME

CROSS REFERENCE TO RELATED APPLICATIONS

This is a National Stage of International Application No. PCT/JP2013/064656 filed May 27, 2013, claiming priority based on Japanese Patent Application No. 2012-180466 filed Aug. 16, 2012, the contents of all of which are incorporated herein by reference in their entirety.

TECHNICAL FIELD

The present invention relates to a lithium secondary battery and a method for producing the same. In particular, it relates to a lithium secondary battery applicable to a power supply installed in a vehicle and a production method thereof.

The present application claims priority based on Japanese Patent Application No. 2012-180466 filed on Aug. 16, 2012, and the entire content thereof is incorporated herein by reference.

BACKGROUND ART

Being lightweight, yet capable of producing high energy densities, lithium secondary batteries are preferably used as so-called portable batteries for PCs and mobile devices, etc., and vehicle-installed batteries. In particular, great importance is placed on them as high-power batteries for driving vehicles such as electric automobiles, hybrid automobiles and the like. In such lithium secondary batteries, it has been suggested to add a cyclic or acyclic silazane to non-aqueous electrolyte solutions to inhibit an increase in internal resistance during charge and discharge cycles. Literatures disclosing this type of conventional art include Patent Documents 1 and 2.

CITATION LIST

Patent Literature

Patent Document 1 Japanese Patent Application Publication No. 2010-086681
Patent Document 2 Japanese Patent No. 3348344

SUMMARY OF INVENTION

Technical Problem

In a lithium secondary battery using a lithium transition metal composite oxide as a positive electrode active material, a transition metal may be dissolved out from the positive electrode depending on the charging and discharging conditions. The dissolved transition metal deactivates lithium that contributes to charging and discharging, presumably causing degradation of cycle characteristics. As a result of earnest investigation by the present inventor, a compound has been found to be able to inhibit lithium deactivation caused by the dissolved transition metal, whereby the present invention has been completed.

The present invention relates to improving a lithium secondary battery using a lithium transition metal composite oxide as a positive electrode active material, with an objective thereof being to provide a lithium secondary battery having greater cycle characteristics. Another objective is to provide a method for producing a lithium secondary battery having such properties.

Solution to Problem

To achieve the objectives, this invention provides a lithium secondary battery using a lithium transition metal composite oxide as a positive electrode active material. On and/or around the negative electrode constituting the lithium secondary battery, there are present a cyclic silazane-based compound and/or a reaction product thereof. The cyclic silazane-based compound comprises a Si—N bond in the ring constituting the cyclic silazane-based compound and also has at least one vinyl group.

According to such a constitution, the vinyl group-containing cyclic silazane-based compound and/or the reaction product thereof act at least on and/or around the negative electrode to inhibit degradation of cycle characteristics caused by a transition metal dissolved out from the positive electrode. Thus, the present invention provides a lithium secondary battery having greater cycle characteristics.

In a preferable embodiment of the lithium secondary battery disclosed herein, the cyclic silazane-based compound is a vinyl group-containing cyclic silazane represented by a formula (1):

[Chem 1]

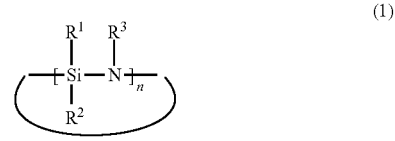

(1)

(in the formula (1), $R^1$ and $R^2$ are either the same or different with each being an organic group having 1 to 12 carbon atoms, and at least either $R^1$ or $R^2$ includes a vinyl group; $R^3$ is a hydrogen atom or an organic group having 1 to 12 carbon atoms; and n is an integer between 2 and 10).

In a preferable embodiment of the lithium secondary battery disclosed herein, the positive electrode active material has an upper operating voltage limit of 4.35 V or higher relative to lithium metal (a voltage relative to lithium metal may be expressed with "vs. Li/Li$^+$" hereinafter). It can be said that because a secondary battery using a positive electrode active material having such a high operating voltage can be charged to a high voltage, it tends to be susceptible to the occurrence of dissolution of a transition metal from the positive electrode due to the high-voltage charging and discharging followed by precipitation of the dissolved metal on the negative electrode. In a secondary battery using such a positive electrode active material, the cyclic silazane-based compound can bring about significantly greater cycle characteristics. The positive electrode active material is preferably a spinel lithium transition metal composite oxide comprising Li and also Ni and Mn as transition metals. The spinel lithium transition metal composite oxide is a preferred example of a positive electrode active material having a high operating voltage (typically having a redox potential (operating voltage) of 4.35 V or higher (vs. Li/Li$^+$)).

The present invention also provides a method for producing a lithium secondary battery. The method comprises obtaining a positive electrode comprising a lithium transition metal composite oxide as a positive electrode active material and a negative electrode; and supplying a cyclic silazane-based compound to at least the negative electrode. The cyclic silazane-based compound comprises a Si—N bond in the ring constituting the cyclic silazane-based compound and has at least one vinyl group. According to such a constitution, the cyclic silazane-based compound having at least one vinyl group and/or a reaction product thereof act to inhibit degradation of cycle characteristics caused by a transition metal dissolved out from the positive electrode. As a result, the lithium secondary battery will have greater cycle characteristics.

In a preferable embodiment of the production method disclosed herein, the supplying the cyclic silazane-based compound includes obtaining a non-aqueous electrolyte comprising the cyclic silazane-based compound and supplying the non-aqueous electrolyte obtained to an electrode body comprising the positive electrode and the negative electrode. By this, the cyclic silazane-based compound is supplied from the non-aqueous electrolyte which can come in contact with the electrode body, whereby the cyclic silazane-based compound can preferably act to produce greater cyclic characteristics.

A preferable embodiment of the production method disclosed herein uses, as the cyclic silazane-based compound, a vinyl group-containing cyclic silazane represented by a formula (1):

[Chem 2]

(1)

(in the formula (1), $R^1$ and $R^2$ are either the same or different with each being an organic group having 1 to 12 carbon atoms, and at least either $R^1$ or $R^2$ includes a vinyl group; $R^3$ is a hydrogen atom or an organic group having 1 to 12 carbon atoms; and n is an integer between 2 and 10).

In a preferable embodiment of the production method disclosed herein, as the positive electrode active material, a positive electrode active material having an upper operating voltage limit of 4.35 V or higher relative to lithium metal is used. In a secondary battery using such a positive electrode active material, the cyclic silazane-based compound can bring about significantly greater cycle characteristics. As the positive electrode active material, it is preferable to use a spinel lithium transition metal composite oxide comprising Li and also Ni and Mn as transition metals.

The lithium secondary battery disclosed herein has greater cycle characteristics. Thus, with the benefit of this feature, it can be preferably used as a power supply for driving a vehicle such as a hybrid automobile (HV), plug-in hybrid automobile (PHV), electric automobile (EV) and the like. The present invention provides a vehicle equipped with a lithium secondary battery disclosed herein (which may be in a form of a multi-cell battery wherein several batteries are connected).

DESCRIPTION of EMBODIMENTS

Figure 1:
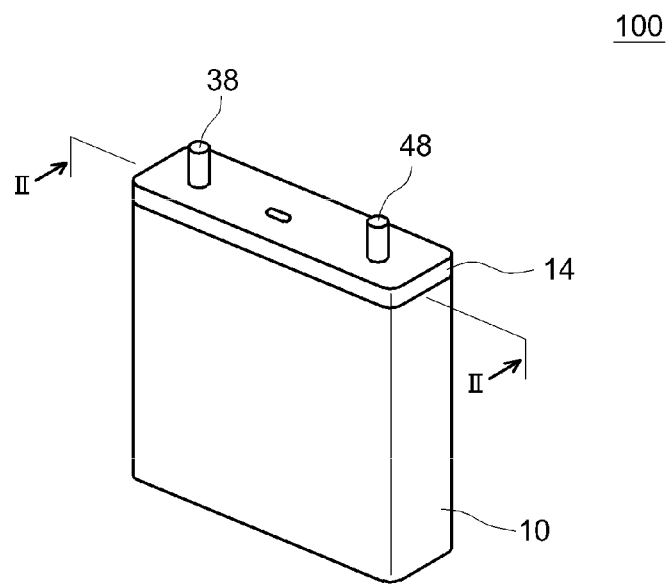
FIG. 1 shows a perspective view schematically illustrating the appearance of the lithium secondary battery according to an embodiment.

While referring to drawings, an embodiment of the present invention is described below. The dimensional relationships (of length, width, thickness, etc.) in each drawing do not represent actual dimensional relationships. Matters (e.g. constitution and manufacturing process of the electrode body comprising the positive electrode and the negative electrode, constitutions and manufacturing processes of the separator, the shape, etc., of the battery (case), general techniques related to construction of the battery, etc.) necessary to practice this invention other than those specifically referred to in this description may be understood as design matters based on the conventional art in the pertinent field to a person of ordinary skills in the art. The present invention can be practiced based on the contents disclosed in this description and common technical knowledge in the subject field. In the drawings referenced below, a common reference numeral may be assigned to members or sites producing the same effect, and duplicated descriptions are sometimes omitted or simplified.

Preferable embodiments related to the lithium secondary battery are described below. In this description, the term "secondary battery" refers to a rechargeable battery in general and includes storage batteries (i.e. chemical batteries) such as lithium secondary batteries and the like as well as capacitors (i.e. physical batteries) such as electric double-layer capacitors and the like. The term "lithium secondary battery" in this description refers to a secondary battery that uses lithium ions (Li ions) as electrolytic ions and charges and discharges by means of transfer of charges associated with Li ions between the positive and negative electrodes. To that extent, the "lithium secondary battery" in this description may include, for instance, a secondary battery using, as charge carriers, other non-lithium metal ions (e.g. sodium ions) in combination. Batteries generally called lithium-ion secondary batteries are typical examples included in the lithium secondary battery in the present description.

Figure 2:
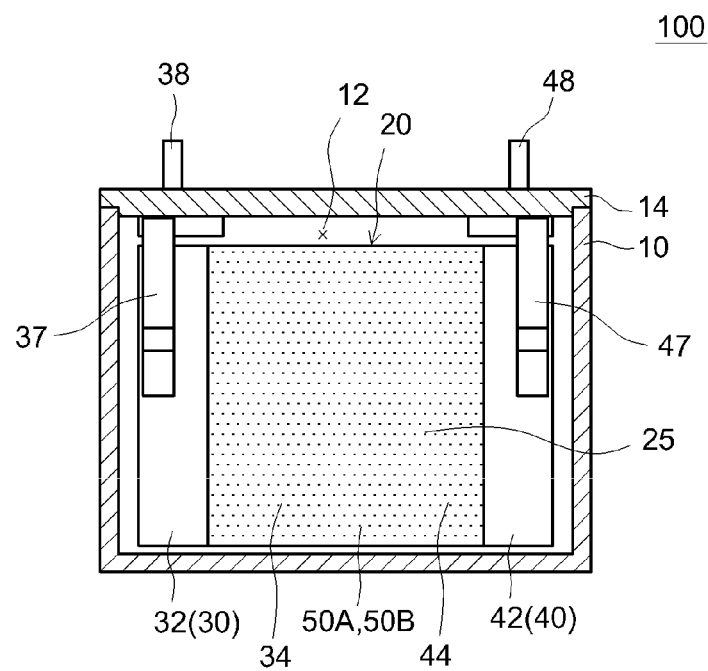
FIG. 2 shows a cross-sectional view taken along the line II-II in FIG. 1.

As shown in FIG. 1 and FIG. 2, a lithium secondary battery 100 comprises a square-shaped battery case 10 and a wound electrode body 20 contained in the battery case 10. Battery case 10 has an opening 12 on the top face. After wound electrode body 20 is placed via opening 12 into battery case 10, the opening 12 is sealed with a lid 14. Battery case 10 further contains a non-aqueous electrolyte (non-aqueous electrolyte solution) 25. Lid 14 is provided with an outer positive terminal 38 and an outer negative terminal 48. Terminals 38 and 48 partially protrude from the surface. Part of outer positive terminal 38 is connected to an inner positive terminal 37 inside the battery case 10 while part of outer negative terminal 48 is connected to an inner negative terminal 47 inside the battery case 10.

Figure 3:
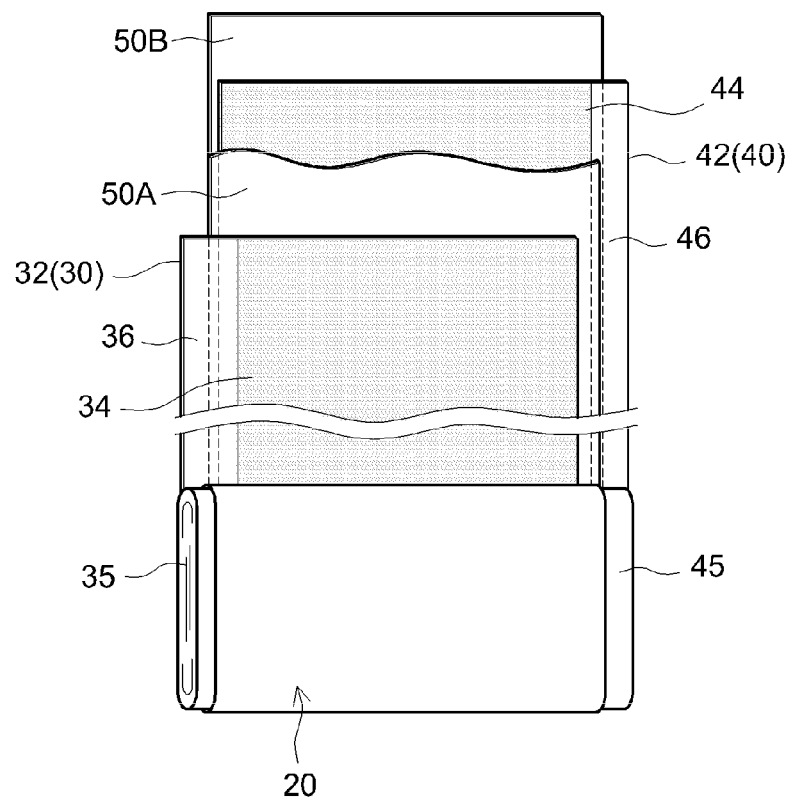
FIG. 3 shows a perspective view schematically illustrating the state of an electrode body according to an embodiment being prepared by means of winding.

As shown in FIG. 3, wound electrode body 20 comprises a long sheet of a positive electrode (positive electrode sheet) 30 and a long sheet of a negative electrode (negative electrode sheet) 40. Positive electrode sheet 30 comprises a length of a positive current collector 32 and a positive electrode material layer 34 formed above at least one (typically each) face thereof. Negative electrode sheet 40 comprises a length of a negative current collector 42 and a negative electrode material layer 44 formed above at least one (typically each) face thereof. Wound electrode body 20 further comprises two long sheets of separator (separator sheets) 50 A and 50B. Positive electrode sheet 30 and negative electrode sheet 40 are layered via two separator sheets 50A and 50B, in the order of positive electrode sheet 30, separator sheet 50A, negative electrode sheet 40 and separator sheet 50B. The layered body is wound in the length direction to form a wound body. The wound body is then laterally compressed and flattened to form a flat shape. The electrode body is not limited to a wound electrode body. Depending on the shape and purpose of the battery, it may have a suitable shape and constitution such as a laminate form, etc.

On the wound electrode body 20, there is formed centrally widthwise (perpendicularly to the winding direction) a portion where the positive electrode material layer 34 formed above the surface of positive current collector 32 and negative electrode material layer 44 formed above the surface of negative current collector 42 are thickly laminated in layers. In positive electrode sheet 30, one edge across the width direction is provided with a portion where positive current collector 32 is exposed with no positive electrode material layer 34 formed thereon (positive electrode material layer-free portion 36). The positive electrode material layer-free portion 36 extends beyond separator sheets 50A, 50B and negative electrode sheet 40. That is, in wound electrode body 20, on one edge across the width direction, there is formed a positive current collector-overlapping portion 35 where the positive electrode material layer-free portion 36 of positive current collector 32 overlaps with itself. On the other edge across the width direction in wound electrode body 20, there is formed also a negative current collector-overlapping portion 45 where the negative electrode material layer-free portion 46 of negative current collector 42 overlaps with itself. Separator sheets 50A and 50B have widths larger than the width of the laminated portion of positive electrode material layer 34 and negative electrode material layer 44, but smaller than the width of wound electrode body 20. These separators placed intermediately in the laminated portion of positive electrode material layer 34 and negative electrode material layer 44 prevent positive electrode material layer 34 and negative electrode material layer 44 from coming into contact with each other and causing internal short-circuit.

The respective components constituting the lithium secondary battery are described next. As the positive current collector constituting the positive electrode (e.g. a positive electrode sheet) in the lithium secondary battery, a conductive material formed of a metal having good conductivity can be preferably used. As such a conductive material, for example, can be used aluminum or an alloy containing aluminum as the primary component. The shape of positive current collector is not particularly limited as it may vary depending on the shape, etc., of the battery, and may have a variety of shapes such as a rod, plate, sheet, foil, mesh, and so on. The thickness of positive current collector is not particularly limited, either, and can be, for instance, 5 μm to 30 μm. The positive electrode material layer may comprise, in addition to a positive electrode active material, additives such as a conductive material, binder, etc., as necessary.

As the positive electrode active material, can be used various materials known to be usable as positive electrode active materials in lithium secondary batteries without particular limitations. For instance, can be used a lithium transition metal compound comprising lithium (Li) and at least one species of transition metal as metals, etc. For instance, a spinel or layered lithium transition metal composite oxide, a polyanion-type (e.g. olivine-type) lithium transition metal compound and the like can be used. More specifically, for instance, the following compounds can be used.

(1) Examples of a spinel lithium transition metal composite oxide include a spinel lithium manganese composite oxide comprising at least manganese (Mn) as a transition metal. More specifically, a spinel lithium manganese composite oxide represented by a general formula $Li_pMn_{2-q}M_qO_{4+\alpha}$ is cited. Herein, p meets $0.9 \leq p \leq 1.2$; q meets $0 \leq q < 2$, typically $0 \leq q \leq 1$ (e.g. $0.2 \leq q \leq 0.6$); and α is a value satisfying $-0.2 \leq \alpha \leq 0.2$ while keeping a net neutral charge. When q is greater than 0 ($0 < q$), M may be one, two or more species selected from optional metals excluding Mn or non-metals. More specifically, it can be Na, Mg, Ca, Sr, Ti, Zr, V, Nb, Cr, Mo, Fe, Co, Rh, Ni, Pd, Pt, Cu, Zn, B, Al, Ga, In, Sn, La, Ce, etc. Among these, at least one species of transition metal such as Fe, Co, Ni, etc., can be preferably used. Specific examples include $LiMn_2O_4$, $LiNi_{0.5}Mn_{1.5}O_4$, $LiCrMnO_4$ and the like.

As a particularly preferable embodiment, a compound such that M in the general formula includes at least Ni (a lithium nickel manganese composite oxide) is cited. More specifically, a spinel lithium nickel manganese composite oxide represented by a general formula $Li_x(Ni_yMn_{2-y-z}M^1_z)O_{4+\beta}$ is cited. Herein, $M^1$ may be an arbitrary transition metal excluding Ni and Mn or a main group metal (e.g. one, two or more species selected from Fe, Co, Cu, Cr, Zn and Al). In particular, $M^1$ preferably includes at least either trivalent Fe or Co. Alternatively, it may be a metalloid (e.g. one, two or more species selected from B, Si and Ge) or a non-metal. In addition, x meets $0.9 \leq x \leq 1.2$; y meets $0 < y$; z meets $0 \leq z$; $y+z<2$ (typically $y+z \leq 1$); and β may be the same as α described above. In a preferred embodiment, y meets $0.2 \leq y \leq 1.0$ (more preferably $0.4 \leq y \leq 0.6$, e.g. $0.45 \leq y \leq 0.55$); z meets $0 \leq z < 1.0$ (e.g. $0 \leq z \leq 0.3$). Specific examples include $LiNi_{0.5}Mn_{1.5}O_4$, etc. With such a composition, the positive electrode potential can be increased (typically to 4.5 V (vs. Li/Li$^+$) or higher) at charge completion, allowing for construction of a 4.5 V or higher class lithium secondary battery. A compound having such a composition is highly durable as well. The presence of a spinel structure in the compound (oxide) can be determined by X-ray structural analysis (preferably single crystal X-ray structural analysis). More specifically, it can be determined by measurement with an X-ray diffraction system using CuKα radiation (wavelength 0.154051 nm) (e.g. "Single Crystal Automatic X-ray Diffractometer" available from Rigaku Corporation).

(2) As a layered lithium transition metal composite oxide, a compound represented by a general formula $LiMO_2$ is cited. Herein, M comprises at least one species of transition metal such as Ni, Co, Mn, etc., and may further comprise other metal(s) or non-metal(s). Specific examples include $LiNiO_2$, $LiNi_{1/3}Co_{1/3}Mn_{1/3}O_2$ and the like.

(3) As the positive electrode active material, a lithium transition metal composite oxide represented by a general formula $Li_2MO_3$ can be used as well. Herein, M comprises at least one species of transition metal such as Mn, Fe, Co, etc., and may further comprise other metal(s) or non-metal(s). Specific examples include $Li_2MnO_3$, $Li_2PtO_3$ and the like.

(4) A lithium transition metal compound (phosphate) represented by a general formula $LiMPO_4$ can be further cited. Herein, M comprises at least one species of transition metal such as Mn, Fe, Ni, Co, etc., and may further comprise other metal(s) or non-metal(s). Specific examples include $LiMnPO_4$, $LiFePO_4$ and the like.

(5) A lithium transition metal compound (phosphate) represented by a general formula $Li_2MPO_4F$ may be used also as the positive electrode active material. Herein, M comprises at least one species of transition metal such as Mn, Ni, Co, etc., and may further comprise other metal(s) or non-metal(s). Specific examples include $Li_2MnPO_4F$ and the like.

(6) As the positive electrode active material, a solid solution of $LiMO_2$ and $Li_2MO_3$ can be used as well. Herein, $LiMO_2$ refers to a composition represented by the general formula shown in (2) above while $Li_2MO_3$ refers to a composition represented by the general formula shown in (3) above. A specific example is a solid solution represented by $0.5LiNiMnCoO_2\text{-}0.5Li_2MnO_3$.

These positive electrode active materials can be used singly as one species or in combination of two or more species. In particular, the positive electrode active material preferably comprises the spinel lithium manganese composite oxide (preferably a lithium nickel manganese composite oxide) at a ratio of 50% by mass or more (typically 50 to 100% by mass, e.g. 70% by mass to 100% by mass, preferably 80 to 100% by mass) of the total positive electrode active material used. It is preferable that the positive electrode active material essentially consists of a spinel lithium manganese composite oxide (preferably a lithium nickel manganese composite oxide).

In the art disclosed herein, for instance, it is preferable that Mn accounts for at least 50% (e.g. 70% or more) by number of atoms of the transition metal(s) contained in the positive electrode active material. A positive electrode active material having such a composition is preferable from the standpoint of costs and supply risks of raw materials, as it mainly uses Mn which is an abundant, inexpensive metal. A positive electrode using a Mn-containing positive electrode active material (e.g. a spinel lithium manganese composite oxide) tends to be susceptible to dissolution of Mn from the positive electrode. Thus, the present invention can be applied to a secondary battery constituted with the positive electrode to preferably bring about the effect of inhibiting degradation of cycle characteristics caused by the dissolved transition metal (Mn).

In a preferable embodiment, as the positive electrode active material, a material having an operating voltage (vs. Li/Li$^+$) higher than that of a general lithium secondary battery (about 4.1 V upper voltage limit) at least in a partial range between 0% SOC (state of charge) and 100% SOC is used. For example, can be preferably used a positive electrode active material having an upper operating voltage Emit higher than 4.2 V (vs. Li/Li$^+$). In other words, a positive electrode active material whose maximum operating voltage between 0% SOC and 100% SOC is higher than 4.2 V (vs. Li/Li$^+$) can be preferably used. The use of such a positive electrode active material can bring about a lithium secondary battery whose positive electrode operates at a voltage higher than 4.2 V (vs. Li/Li$^+$). Preferred examples of such a positive electrode active material include $LiNi_PMn_{2-P}O_4$ (0.2≤P≤0.6; e.g. $LiNi_{0.5}Mn_{1.5}O_4$), $LiMn_2O_4$, $LiNiPO_4$, $LiCoPO_4$, $LiMnPO_4$, $LiNi_{1/3}Co_{1/3}Mn_{1/3}O_2$, $0.5LiNiMnCoO_2\text{-}0.5Li_2MnO_3$ and the like. The positive electrode active material has an upper operating voltage limit (vs. Li/Li$^+$) of preferably 4.3 V or higher (e.g. 4.35 V or higher, even 4.5 V or higher), or particularly preferably 4.6 V or higher (e.g. 4.8 V or higher, even 4.9 V or higher). While the upper limit of the operating voltage (vs. Li/Li$^+$) is not particularly limited, it can be 5.5 V or lower (e.g. 5.3 V or lower, typically 5.1 V or lower).

Herein, the operating voltage of a positive electrode active material can be determined as follows. In particular, a three-electrode cell is constructed, using a positive electrode comprising a positive electrode active material to be measured as a working electrode (WE), along with a lithium metal piece as a counter electrode (CE), another lithium metal piece as a reference electrode (RE), and an electrolyte solution containing approximately 1 mol/L of $LiPF_6$ in a mixed solvent at an ethylene carbonate (EC) to dimethyl carbonate (DMC) ratio of 30/70 (by volume). Based on the theoretical capacity of the cell, the SOC value of the cell is changed by a 5% increment from 0% SOC to 100% SOC. The SOC can be adjusted, for instance, by applying a constant-current charge between WE and CE with a general charging/discharging device or a potentiostat. The cell adjusted to each SOC value is left standing for one hour and then subjected to a measurement of voltage across WE and RE, whereby the voltage can be recorded as the operating voltage (vs. Li/Li$^+$) of the positive electrode active material at that particular SOC value. In general, between 0% SOC and 100% SOC, the operating voltage of a positive electrode active material is maximized in a SOC range that includes 100% SOC. Thus, the upper operating potential limit of the positive electrode active material (e.g., whether or not it is above 4.2 V) can be usually assessed based on the operating voltage of the positive electrode active material at 100% SOC (i.e., when fully charged).

The positive electrode active material is usually preferably in a form of particles having an average particle diameter of about 1 μm to 20 μm (e.g. 2 μm to 10 μm). Unless otherwise specified, the term "average particle diameter" in the present description refers to a particle diameter at 50% cumulative volume in a size distribution measured by a size distribution analyzer based on laser scattering/diffraction, that is, a 50% volume average particle diameter.

As the conductive material, a conductive powdery material such as carbon powder and carbon fiber are preferably used. Preferable examples of carbon powder include various kinds of carbon black, such as acetylene black, furnace black, Ketjen black, graphite powder and the like. Alternatively, among conductive fiber species such as carbon fiber, metal fiber, etc., and powdered metals such as copper, nickel, etc., and organic conductive materials such as polyphenylene derivatives, etc., and the like, solely one species or a mixture of two or more species can be used.

Examples of the binder include various polymer materials. For instance, when the positive electrode material layer is formed with an aqueous composition (a composition wherein water or a mixed solvent primarily comprising water is used as the dispersion medium for active material particles), a water-soluble or water-dispersible polymer material can be preferably used as a binder. Examples of water-soluble or water-dispersible polymer materials include cellulose-based polymers such as carboxymethyl cellulose (CMC), etc.; polyvinyl alcohol (PVA); fluorine-based resins such as polytetrafluoroethylene (PTFE), etc.; vinyl acetate based polymers; rubbers such as styrene-butadiene rubber (SBR), acrylic acid-modified SBR resins (SBR-based latexes), etc.; and the like. Alternatively, when the positive electrode material layer is formed with a solvent-based composition (a composition whose dispersion medium for active material particles primarily comprises an organic solvent), can be used polymer materials including vinyl halide resins such as polyvinylidene fluoride (PVdF), polyvinylidene chloride (PVdC), etc.; polyalkylene oxides such as polyethylene oxide (PEO), etc.; and the like. These binders can be used singly as one species or in combination of two or more species. The polymer materials exemplified above may be used also as thickeners or other additives in the positive electrode material layer-forming composition, besides being used as the binder.

The positive electrode active material content in the positive electrode material layer is higher than about 50% by mass, or preferably about 70 to 97% by mass (e.g. 75 to 95% by mass). The additive content in the positive electrode material layer is not particularly limited. The conductive material content is preferably about 1 to 20 parts by mass (e.g. 2 to 10 parts by mass, typically 3 to 7 parts by mass) relative to 100 parts by mass of positive electrode active material. The binder content is preferably about 0.8 to 10 parts by mass (e.g. 1 to 7 parts by mass, typically 2 to 5 parts by mass) relative to 100 parts by mass of positive electrode active material.

The method for fabricating a positive electrode as described above is not particularly limited and a conventional method can be suitably used. For instance, it can be fabricated by the following method. First, a positive electrode active material and, as necessary, a conductive material, binder, etc., are mixed with a suitable solvent (an aqueous solvent, non-aqueous solvent or a mixed solvent of these) to prepare a paste-like or slurry positive electrode material layer-forming composition. The mixing can be carried out, for instance, using a suitable mixer (planetary mixer, etc.). For the solvent used to prepare the composition, any of aqueous solvents and non-aqueous solvents can be used. The aqueous solvent should just show aqueous properties, and water or a solvent mixture primarily comprising water can be preferably used. Preferred examples of non-aqueous solvents include N-methyl-2-pyrrolidone (NMP), methyl ethyl ketone, toluene, etc.

The composition thus prepared is applied to a positive current collector and then pressed after the solvent is allowed to evaporate off by drying. As a method for applying the composition to the positive current collector, can be suitably employed a technique similar to conventionally-known methods. For example, with a suitable applicator such as die coater, etc., the composition can be preferably applied to the positive current collector. The solvent can be dried off well by employing one or a combination of natural drying, heated air drying, vacuum drying, etc. As a pressing method, can be employed a compression method such as a conventionally-known roll-pressing method, etc. A positive electrode can be thus obtained having a positive electrode material layer formed above the positive current collector.

The coating weight of positive electrode material layer (non-volatile-based coating amount of positive electrode material layer-forming composition) per unit surface area of positive current collector is not particularly limited. From the standpoint of obtaining sufficient conductive paths (conducting paths), it is preferably 3 $mg/cm^2$ or greater (e.g. 5 $mg/cm^2$ or greater, typically 6 $mg/cm^2$ or greater), but 45 $mg/cm^2$ or less (e.g. 28 $mg/cm^2$ or less, typically 15 $mg/cm^2$ or less) per face of positive current collector.

As the negative current collector constituting the negative electrode (e.g. a negative electrode sheet), can be preferably used a conductive member formed of a metal having a good conductivity. For example, can be used copper or an alloy comprising copper as the primary component. The shape of negative current collector is not particularly limited as it may vary in accordance with the shape of the battery, etc. It may be in various forms including shapes of a rod, plate, sheet, foil, mesh, and so on. The thickness of negative current collector is not particularly limited, either. It can be about 5 μm to 30 μm.

The negative electrode material layer comprises a negative electrode active material capable of storing and releasing Li ions which serve as charge carriers. The composition and shape of negative electrode active material are not particularly limited. One, two or more species of substance conventionally used in lithium secondary batteries can be used. Examples of such a negative electrode active material include carbon materials generally used in lithium secondary batteries. Typical examples of such carbon materials include graphite carbons (graphite), amorphous carbons and the like. It is preferable to use a granular carbon material (carbon particles) containing a graphite structure (layered structure) at least partially. In particular, the use of a carbon material primarily comprising natural graphite is preferable. The natural graphite may be obtained by spheroidizing graphite flakes. Alternatively, a carbonaceous powder obtained by coating graphite surfaces with an amorphous carbon can be used. As other negative electrode active materials, oxides such as lithium titanate, etc.; silicon materials, tin materials and so on can be used singly, as an alloy, as a compound formed therefrom or as a composite material combining these materials. In particular, it is especially preferable to use a negative electrode active material having a reduction potential (vs. Li/Li$^+$) of about 0.5 V or lower (e.g. 0.2 V or lower, typically 0.1 V or lower). The use of a negative electrode active material having such a reduction potential can bring about a high energy density. Examples of a material exhibiting such a low potential include a graphitic carbon material (typically graphite particles). The negative electrode active material content in the negative electrode material layer is higher than about 50% by mass, or preferably about 90 to 99% by mass (e.g. 95 to 99% by mass, typically 97 to 99% by mass).

The negative electrode material layer may comprise, besides the negative electrode active material, one, two or more species of binder, thickener and other additives that can be used in a negative electrode material layer in a general lithium secondary battery. Binders include various polymer materials. For example, with respect to an aqueous composition or a solvent-based composition, those that can be contained in the positive electrode material layer may be preferably used. Such binder may be used, not just as a binder, but also as a thickener or other additive in a negative electrode material layer-forming composition. The additive content in the negative electrode material layer is not particularly limited. It is preferably about 0.8 to 10% by mass (e.g. about 1 to 5% by mass, typically 1 to 3% by mass).

The method for fabricating a negative electrode is not particularly limited and a conventional method can be employed. For instance, it can be fabricated by the following method. First, a negative electrode active material is mixed along with a binder, etc., in an aforementioned suitable solvent (an aqueous solvent, organic solvent or a mixed solvent of these) to prepare a paste-like or slurry negative electrode material layer-forming composition. The composition thus prepared is applied to a negative current collector and then pressed after the solvent is allowed to evaporate off by drying. A negative electrode material layer can be thus formed with the composition above the negative current collector to obtain a negative electrode comprising the negative electrode material layer. For the mixing, coating, drying and pressing methods, means similar to those for the positive electrode fabrication can be employed.

The coating weight of negative electrode material layer (non-volatile-based coating amount of negative electrode material layer-forming composition) per unit surface area of negative current collector is not particularly limited. From the standpoint of obtaining sufficient conductive paths (conducting paths), it is preferably 2 mg/cm$^2$ or greater (e.g. 3 mg/cm$^2$ or greater, typically 4 mg/cm$^2$ or greater), but 40 mg/cm$^2$ or less (e.g. 22 mg/cm$^2$ or less, typically 10 mg/cm$^2$ or less) per face of negative current collector.

In the lithium secondary battery in the art disclosed herein, the cyclic silazane-based compound and/or a reaction product thereof are present on and/or around the negative electrode (typically on the negative electrode surface, possibly inside the negative electrode (typically inside the negative electrode material layer)). The cyclic silazane-based compound in the art disclosed herein can be defined to include at least one Si—N bond in (within) the ring constituting the compound. The compound has at least one vinyl group as well. By having a Si-including ring structure and a vinyl group, the cyclic silazane-based compound and/or the reaction product thereof act at least on and/or around the negative electrode to inhibit degradation of cycle characteristics caused by a transition metal dissolved out from the positive electrode.

The activity of the cyclic silazane-based compound is described more in detail here. Repeated charging and discharging (typically at a high voltage) may cause dissolution of a transition metal (e.g. Mn) from the positive electrode. The dissolved transition metal may precipitate out, for instance, on the negative electrode surface. Presumably, this deactivates lithium that could contribute to charging and discharging and causes degradation of cycle characteristics. Accordingly, the battery is constituted to include the cyclic silazane-based compound in the battery so that it can be present on and/or around the negative electrode (typically on the negative electrode surface). The cyclic silazane-based compound will then precipitate out (typically forms a coating as a reaction product of the cyclic silazane-based compound) on an electrode surface (mainly on the negative electrode surface). The precipitate (coating) is considered to act to inhibit the lithium deactivation and contribute to suppress degradation of cycle characteristics. By the present inventor, it has been found that the effect of bringing about greater cycle characteristics cannot be obtained with a silicon-containing compound that has a vinyl group, but not a cyclic structure (e.g. a linear or branched siloxane having a vinyl group) or with a cyclic silazane-based compound free of a vinyl group (e.g. a vinyl group-free cyclic silazane). While the mechanism has not been revealed, it is presumed that the presence of a cyclic structure and a vinyl group is important in bringing about greater cycle characteristics.

As described above, the term "cyclic silazane-based compound and/or a reaction product thereof" is used to include a component (typically a precipitate) derived from the cyclic silazane-based compound. It can be considered to comprise at least either a cyclic silazane-based compound or a reaction product thereof. The presence of a precipitate (coating) formed from a cyclic silazane-based compound can be assessed, for instance, by analyzing samples collected from electrode surfaces by a known analytical means such as ICP (high frequency inductive coupling plasma) emission analysis, etc.

The cyclic silazane-based compound disclosed herein is not particularly limited as long as it comprises at least one Si—N bond in the ring constituting the compound while having at least one vinyl group. Accordingly, at least one of the atoms constituting the ring is Si and at least one of the atoms constituting the ring is a nitrogen atom (N). The number of atoms constituting the ring is not particularly limited. In view of the coating formation, etc., it is suitably 3 to 20, or preferably 3 to 12 (e.g. 3 to 10, typically 6 or 8). Besides Si and N, it may comprise, as the ring-constituting atoms, other atom(s) such as a carbon atom (C), oxygen atom (O), etc. It may comprise a Si—O bond in the ring as well. Alternatively, it may consist of Si and N atoms as the ring-constituting atoms. Such a compound may be a so-called cyclic silazane in which Si and N are alternately connected to constitute a ring.

The cyclic silazane-based compound has at least one vinyl group. While the number of vinyl groups is not particularly limited as long as there is at least one, it is suitably 1 to 20 or preferably 2 to 12 (e.g. 3 to 8, typically 3 to 4). It is preferable that at least one vinyl group (e.g. two or more vinyl groups, typically all vinyl groups) is bonded directly to the ring-constituting Si.

Preferable examples of the cyclic silazane-based compound disclosed herein include a vinyl group-containing cyclic silazane represented by a formula (1):

[Chem 3]

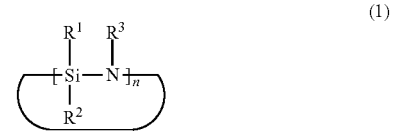

(1)

Herein, in the formula (1), $R^1$ and $R^2$ may be each a hydrogen atom or an organic group having 1 to 12 carbon atoms. $R^1$ and $R^2$ can be either the same or different. At least either $R^1$ or $R^2$ comprises a vinyl group. $R^3$ is a hydrogen atom or an organic group having 1 to 12 carbon atoms while n is an integer between 2 and 10.

In the formula (1), $R^1$ and $R^2$ may be each a hydrogen atom or an organic group having 1 to 12 carbon atoms. From the standpoint of suitably bringing about the effect by the cyclic silazane (bringing about greater cycle characteristics), $R^1$ and $R^2$ are each preferably an organic group having 1 to 6 (e.g. 1 to 4, typically 1 or 2) carbon atoms. Examples of such organic groups include linear alkyl groups such as methyl, ethyl, n-propyl, isopropyl, n-butyl, isobutyl, sec-butyl, t-butyl, n-pentyl, 1-methylbutyl, 2-methylbutyl, 3-methylbutyl, 1-methyl-2-methlpropyl, 2,2-dimethylpropyl, hexyl, heptyl, octyl, nonyl, decyl, etc.; cyclic alkyl groups such as cyclohexyl, norbornanyl, etc.; alkenyl groups such as vinyl, 1-propenyl, allyl, butenyl, 1,3-butadienyl, etc.; alkynyl groups such as ethynyl, propynyl, butynyl, etc.; halogenated alkyl groups such as trifluoropropyl, etc.; saturated heterocyclic group-containing alkyl groups such as 3-pyrrolizinopropyl, etc.; aryl groups such as a phenyl group which may have an alkyl group, etc.; aralkyl groups such as phenylmethyl, phenylethyl, etc.; trialkylsilyl groups such as trimethylsilyl, etc.; trialkylsiloxyl groups such as trimethylsiloxyl, etc.; and the like. In particular, from the standpoint of suitably bringing about the effect by the cyclic silazane, the organic group is preferably a methyl, ethyl, vinyl, propenyl, or phenyl group, with the methyl and vinyl groups being particularly preferable.

In the formula (1), at least either $R^1$ or $R^2$ comprises a vinyl group. Preferably, at least either $R^1$ or $R^2$ is a vinyl group. Alternatively, at least either $R^1$ or $R^2$ may be an organic group containing a vinyl group. As such vinyl group-containing organic groups, alkenyl groups are cited. The number of carbon atoms in an alkenyl group is not particularly limited. From the standpoint of suitably bringing about the effect by the cyclic silazane, it is suitably 3 to 8 (e.g. 3 to 6, typically 3 or 4). Specific examples of alkenyl groups include allyl, butenyl, 1,3-butadienyl, pentenyl, hexenyl, heptenyl, and octenyl groups. In particular, at least either $R^1$ or $R^2$ (typically only one between $R^1$ and $R^2$) is preferably a vinyl group.

In the formula (1), $R^3$ is a hydrogen atom or an organic group having 1 to 12 carbon atoms. $R^3$ is preferably a hydrogen atom or an organic group having 1 to 6 (e.g. 1 to 4, typically 1 or 2) carbon atoms. As such organic groups, organic groups listed as examples of $R^1$ and $R^2$ in the formula (1) can be preferably used. Among them, from the standpoint of preferably obtaining the effect by the cyclic silazane, $R^3$ is preferably a hydrogen atom, methyl group, ethyl group, vinyl group, propenyl group or phenyl group, with the hydrogen atom, methyl group and vinyl group being particularly preferable.

In the formula (1), n is an integer between 2 and 10. From the standpoint of obtaining greater cycle characteristics, n is preferably an integer between 2 and 6, more preferably an integer between 3 and 5, or particularly preferably 3 or 4.

Specific examples of a vinyl group-containing cyclic silazane described above include a vinyl group-containing cyclodisilazane, vinyl group-containing cyclotrisilazane, vinyl group-containing cyclotetrasilazane, vinyl group-containing cyclopentasilazane, vinyl group-containing cyclohexasilazane, vinyl group-containing cycloheptasilazane, vinyl group-containing cyclooctasilazane, vinyl group-containing cyclononasilazane and vinyl group-containing cyclodecasilazane. These can be used singly as one species or in combination of two or more species. In particular, from the standpoint of obtaining greater cycle characteristics, a vinyl group-containing cyclodisilazane, vinyl group-containing cyclotrisilazane, vinyl group-containing cyclotetrasilazane, vinyl group-containing cyclopentasilazane and vinyl group-containing cyclohexasilazane are preferable while the vinyl group-containing cyclotrisilazane is particularly preferable. Among the vinyl group-containing cyclic silazanes, a compound having a vinyl group bonded to every Si that constitutes the cyclic silazane ring is preferable. Alternatively, it may be a compound having two vinyl groups bonded to a Si (typically to every Si) that constitutes the cyclic silazane ring.

Examples of a vinyl group-containing cyclodisilazane include a cyclodisilazane having one vinyl group such as 2,4,4-trimethyl-2-vinylcyclosilazane, 1,2,3,4,4-pentamethyl-2-vinylcyclosilazane, etc.; a cyclodisilazane having two vinyl groups such as 2,4-dimethyl-2,4-divinylcyclodisilazane, 1,2,3,4-tetramethyl-2,4-divinylcyclodisilazane, etc.; a cyclodisilazane having four vinyl groups such as tetravinylcyclodisilazane, etc; and the like. These can be used singly as one species or in combination of two or more species. Among these, 2,4-dimethyl-2,4-divinylcyclodisilazane is particularly preferable.

Examples of a vinyl group-containing cyclotrisilazane include a cyclotrisilazane having one vinyl group such as 2,4,4,6,6-pentamethyl-2-vinylcyclotrisilazane, etc.; a cyclotrisilazane having two vinyl groups such as 2,4,6,6-tetramethyl-2,4-divinylcyclotrisilazane, etc.; a cyclotrisilazane having three vinyl groups such as 2,4,6-trimethyl-2,4, 6-trivinylcyclotrisilazane, etc.; a cyclotrisilazane having six vinyl groups such as hexavinylcyclotrisilazane, etc.; and the like. These can be used singly as one species or in combination of two or more species. Among these, 2,4,6-trimethyl-2,4,6-trivinylcyclotrisilazane is particularly preferable.

Examples of a vinyl group-containing cyclotetrasilazane include a cyclotetrasilazane having one vinyl group such as 2,4,4,6,6,8,8-heptamethyl-2-vinylcyclotetrasilazane, etc.; a cyclotetrasilazane having two vinyl groups such as 2,4,6,6,8,8-hexamethyl-2,4-divinylcyclotetrasilazane, etc.; a cyclotetrasilazane having three vinyl groups such as 2,4,6,8,8-pentamethyl-2,4,6-trivinylcyclotetrasilazane, etc.; a cyclotetrasilazane having four vinyl groups such as 2,4,6,8-tetramethyl-2,4,6,8-tetravinylcyclotetrasilazane, etc.; a cyclotetrasilazane having eight vinyl groups such as octavinylcyclotetrasilazane, etc.; and the like. These can be used singly as one species or in combination of two or more species. Among these, 2,4,6,8-tetramethyl-2,4,6,8-tetravinylcyclotetrasilazane is particularly preferable.

Examples of a vinyl group-containing cyclopentasilazane include 2,4,4,6,6,8,8,10,10-nonamethyl-2-vinylcyclopentasilazane, 2,4,6,8,10-pentamethyl-2,4,6,8,10-pentavinylcyclopentasilazane, decavinylcyclopentasilazane, etc. Examples of a vinyl group-containing cyclohexasilazane include 2,4,6,8,10,12-hexamethyl-2,4,6,8,10,12-hexavinylcyclohexasilazane, etc. Examples of a vinyl group-containing cycloheptasilazane include 2,4,6,8,10,12,14-heptamethyl-2,4,6,8,10,12,14-heptavinylcycloheptasilazane, etc. Examples of a vinyl group-containing cyclooctasilazane include 2,4,6,8,10,12,14,16-octamethyl-2,4,6,8,10,12,14,16-octavinylcyclooctasilazane, etc. Examples of a vinyl group-containing cyclonanosilazane include 2,4,6,8,10,12,14,16,18-nonamethyl-2,4,6,8,10,12,14,16,18-nonavinylcyclononasilazane, etc. Examples of a vinyl group-containing cyclodecasilazane include 2,4,6,8,10,12,14,16,18,20-decamethyl-2,4,6,8,10,12,14,16,18,20-decavinylcyclodecasilazane, etc. These can be used singly as one species or in combination of two or more species.

The separator (separator sheet) placed so as to separate the positive electrode and negative electrode should be formed of a material that insulates the positive electrode material layer and negative electrode material layer while allowing transport of the electrolyte. A preferable example of separator is constituted with a porous polyolefin-based resin. For instance, can be preferably used an about 5 μm to 30 μm thick separator sheet made of a synthetic resin (e.g. a polyethylene, polypropylene, polyolefin having a structure including two or more layers of these in combination). The separator sheet may be provided with a heat-resistant layer. Alternatively, when, instead of a liquid-form electrolyte, a solid-form (gel-form) electrolyte comprising the aforementioned electrolyte and a polymer added thereto is used, the electrolyte itself may serve as a separator, necessitating no separator.

The non-aqueous electrolyte injected into the lithium secondary battery may comprise at least a non-aqueous solvent and a supporting salt. A typical example is an electrolyte solution having a composition comprising a supporting salt in a suitable non-aqueous solvent. Examples of the non-aqueous solvent include ethylene carbonate (EC), propylene carbonate (PC), diethyl carbonate (DEC), dimethyl carbonate (DMC), ethyl methyl carbonate (EMC), 1,2-dimethoxyethane, 1,2-diethoxyethane, tetrahydrofuran, 2-methyltetrahydrofuran, dioxane, 1,3-dioxolane, diethylene glycol dimethyl ether, ethylene glycol dimethyl ether, acetonitrile, propionitrile, nitromethane, N,N-dimethylformamide, dimethylsulfoxide, sulfolane, γ-butyrolactone, etc., among which solely one species or a mixture of two or more species can be used. In particular, a solvent mixture of EC, DMC and EMC is preferable.

The non-aqueous electrolyte (non-aqueous electrolyte solution) preferably comprises, as the non-aqueous solvent, one, two or more species of fluorinated carbonate (e.g. a fluoride of an aforementioned carbonate). In general, under a condition where charging is performed to such a voltage that causes dissolution of a transition metal from the positive electrode, a non-aqueous electrolyte tends to be susceptible to oxidative decomposition. However, the use of a non-aqueous electrolyte comprising a highly oxidation-resistant fluorinated carbonate inhibits oxidative decomposition of the non-aqueous electrolyte. Such a non-aqueous electrolyte is preferable for use in a secondary battery that is going to be charged or discharged under a condition that may cause transition metal dissolution from the positive electrode. As the fluorinated carbonate, either a fluorinated cyclic carbonate or fluorinated acyclic carbonate can be preferably used. Usually, it is preferable to use a fluorinated carbonate having one carbonate moiety per molecule. The F-substitution ratio in such a fluorinated carbonate is usually suitable to be 10% or greater, or for instance, it can be 20% or greater (typically 20% or greater, but smaller than 100%, e.g., 20% or greater, but 80% or smaller).

The fluorinated carbonate preferably exhibits an oxidation potential equal to or higher than the upper operating voltage limit (vs. Li/Li$^+$) of the positive electrode active material. As such a fluorinated carbonate, it is preferable to use, for example, one having an oxidation potential higher than the upper operating voltage limit (vs. Li/Li$^+$) of the positive electrode active material by greater than 0 V (typically by about 0.1 V to 3.0 V, preferably by about 0.2 V to 2.0 V, e.g., by about 0.3 V to 1.0 V), by greater than 0V but less than 0.3 V, or by 0.3 V or greater (typically by about 0.3 V to 3.0 V, preferably by about 0.3 V to 2.0 V, e.g., by about 0.3 V to 1.5 V).

The oxidation potential (vs. Li/Li$^+$) of an electrolyte solution can be measured by the following method. First, using LiNi$_{0.5}$Mn$_{1.5}$O$_4$, a working electrode (WE) is fabricated similarly to the positive electrode described later in the worked examples. A three-electrode cell is constructed with the WE fabricated, a lithium metal piece as a counter electrode (CE), another lithium metal piece as a reference electrode (RE) and the electrolyte solution to be measured. The three-electrode cell is subjected to a treatment to completely remove Li from the WE. In particular, at a temperature of 25° C., at a current value equivalent to one-fifth the battery capacity (Ah) predicted from the theoretical capacity of the WE, the cell is subjected to constant current charging to 4.5 V followed with constant voltage charging at 4.5 V until the current value decayed to 1/50 the initial current value (i.e. the current value equivalent to one-fifth the battery capacity). Subsequently, in a voltage range predicted to include the oxidation potential of the electrolyte solution being measured (typically in a voltage range higher than 4.5 V), constant current charging is carried out at an arbitrary voltage value for a prescribed time period (e.g. 10 hours) and the current value is measured during this operation. More specifically, the voltage is increased stepwise (e.g. by a 0.2 V increment) within the voltage range. Constant voltage charging is carried out at each step for a prescribed time period (e.g. about 10 hours) and the current value is measured during this operation. The voltage value at which the current value during constant voltage charging becomes greater than 0.1 mA can be recorded as the oxidation potential (redox potential) of the electrolyte solution.

A preferable fluorinated cyclic carbonate has 2 to 8 (more preferably 2 to 6, e.g., 2 to 4, typically 2 or 3) carbon atoms. With too many carbon atoms, the viscosity of the non-aqueous electrolyte solution may increase, or the ionic conductivity may decrease. For instance, a fluorinated cyclic carbonate represented by the following formula (C1) can be preferably used.

[Chem 4]

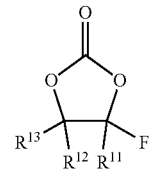

(C1)

In the formula (C1), each of $R^{11}$, $R^{12}$ and $R^{13}$ can be independently selected from a hydrogen atom, a fluorine atom, alkyl groups and haloalkyl groups having 1 to 4 (more preferably 1 or 2, typically 1) carbon atom(s), and other halogen atoms (preferably a chlorine atom) besides fluorine atom. The haloalkyl group may have a structure obtained by substituting one, two or more hydrogen atoms of the alkyl group with halogen atom(s) (e.g., fluorine atom(s) or chlorine atom(s), preferably fluorine atom(s)). In a preferable compound, one or two of $R^{11}$, $R^{12}$ and $R^{13}$ are fluorine atom(s). For instance, a compound with at least one of $R^{12}$ and $R^{13}$ being a fluorine atom is preferable. From the standpoint of decreasing the viscosity of the non-aqueous electrolyte solution, can be preferably used a compound in which each of $R^{11}$, $R^{12}$ and $R^{13}$ is a fluorine atom or a hydrogen atom.

Specific examples of the fluorinated cyclic carbonate represented by the formula (C1) include mono-fluoroethylene carbonate (MFEC), difluoroethylene carbonate (DEFC), 4,4-difluoroethylene carbonate, trifluoroethylene carbonate, perfluoroethylene carbonate, 4-fluoro-4-methylethylene carbonate, 4,5-difluoro-4-methylethylene carbonate, 4-fluoro-5-methylethylene carbonate, 4,4-difluoro-5-methylethylene carbonate, 4-(fluoromethyl)-ethylene carbonate, 4-(difluoromethyl)-ethylene carbonate, 4-(trifluoromethyl)-ethylene carbonate, 4-(fluoromethyl)-4-fluoroethylene carbonate, 4-(fluoromethyl)-5-fluoroethylene carbonate, 4-fluoro-4,5-dimethylethylene carbonate, 4,5-difluoro-4,5-dimethylethylene carbonate, 4,4-difluoro-5,5-dimethylethylene carbonate, and the like. In particular, MFEC and DFEC are preferable.

As the non-aqueous electrolyte solution in the art disclosed herein, for instance, a fluorinated acyclic carbonate represented by the next formula (C2) can be used.

[Chem 5]

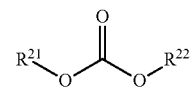

(C2)

At least either $R^{21}$ or $R^{22}$ (preferably each of these) in the formula (C2) is a F-containing organic group, and it can be, for example, a fluorinated alkyl group or a fluorinated alkyl ether group. It can be a fluorinated alkyl group or a fluorinated alkyl ether group that has been further substituted with a halogen atom other than a fluorine atom. One of $R^{21}$ and $R^{22}$ may be an organic group (e.g., an alkyl group or an alkyl ether group) not containing a fluorine atom. Each of $R^{21}$ and $R^{22}$ is preferably an organic group having 1 to 6 (more preferably 1 to 4, e.g., 1 to 3, typically 1 or 2) carbon atoms. With too many carbon atoms, the viscosity of the non-aqueous electrolyte solution may increase, or the ionic conductivity may decrease. For similar reasons, in usual, it is preferable that at least one of $R^{21}$ and $R^{22}$ is a straight chain, and it is more preferable that each of $R^{21}$ and $R^{22}$ is a straight chain. For instance, it is preferable to use a fluorinated acyclic carbonate in which each of $R^{21}$ and $R^{22}$ is a fluoroalkyl group with each containing a total of one or two carbon atom(s).

Specific examples of the fluorinated acyclic carbonate represented by the formula (C2) include fluoromethyl methyl carbonate, difluoromethyl methyl carbonate, trifluoromethyl methyl carbonate, fluoromethyl difluoromethyl carbonate, bis(fluoromethyl) carbonate, bis(difluoromethyl) carbonate, bis(trifluoromethyl) carbonate, 2-fluoroethyl methyl carbonate, ethyl fluoromethyl carbonate, 2,2-difluoroethyl methyl carbonate, 2-fluoroethyl fluoromethyl carbonate, ethyl difluoromethyl carbonate, 2,2,2-trifluoroethyl methyl carbonate, 2,2-difluoroethyl fluoromethyl carbonate, 2-fluoroethyl difluoromethyl carbonate, ethyl trifluoromethyl carbonate, ethyl 2-fluoroethyl carbonate, ethyl 2,2-difluoroethyl carbonate, bis(2-fluoroethyl) carbonate, ethyl 2,2,2-trifluoroethyl carbonate, 2,2-difluoroethyl 2'-fluoroethyl carbonate, bis(2,2-difluoroethyl) carbonate, 2,2,2-trifluoroethyl 2'-fluoroethyl carbonate, 2,2,2-trifluoroethyl 2', 2'-difluoroethyl carbonate, bis(2,2,2-trifluoroethyl) carbonate, pentafluoroethyl methyl carbonate, pentafluoroethyl fluoromethyl carbonate, pentafluoroethyl ethyl carbonate, bis(pentafluoroethyl) carbonate, and the like.

The amount of the fluorinated carbonate is preferably, for instance, 2% by volume or more (e.g. 5% by volume or more, typically 10% by volume or more) of all components in the non-aqueous electrolyte solution excluding the supporting salt (or "non-supporting-salt components" hereinafter). Essentially 100% by volume (typically 99% by volume or more) of the non-supporting-salt components may be a fluorinated carbonate. Usually, from the standpoint of reducing the viscosity of the non-aqueous electrolyte solution or increasing its ion conductivity, the amount of fluorinated carbonate in the non-supporting-salt components is preferably 90% by volume or less (e.g. 70% by volume or less, typically 60% by volume or less).

Other preferable examples include a non-aqueous electrolyte solution comprising a non-aqueous solvent that comprises a dialkyl carbonate whose alkyl group has 1 to 4 carbon atoms (e.g. DEC) and a fluorinated carbonate (e.g. DFEC), wherein their volume ratio is 1:9 to 9:1 (e.g. 3:7 to 7:3, typically 4:6 to 6:4) and their combined amount accounts for 50% by volume or more (e.g. 70% by volume or more, typically 90% by volume or more, but 100% by volume or less) of the non-supporting-salt components.

As the supporting salt, for example, can be used one, two or more species of lithium compounds (lithium salts) such as $LiPF_6$, $LiBF_4$, $LiClO_4$, $LiAsF_6$, $LiCF_3SO_3$, $LiC_4F_9SO_3$, $LiN(CF_3SO_2)_2$, $LiC(CF_3SO_2)_3$, LiI and the like. The supporting salt concentration is not particularly limited while it can be about 0.1 mol/L to 5 mol/L (e.g. 0.5 mol/L to 3 mol/L, typically 0.8 mol/L to 1.5 mol/L).

The non-aqueous electrolyte may comprise optional additives as necessary to an extent not significantly impairing the objectives of the present invention. The additive may be used for one, two or more purposes, such as to increase the battery's output performance, to increase the shelf life (to inhibit a capacity decrease during storage, etc.), to bring about greater cycle characteristics, to increase the initial charging and discharging efficiencies, and so on. Examples of preferable additives include a fluorophosphate (preferably a difluorophosphate, e.g. lithium difluorophosphate represented by $LiPO_2F_2$) and lithium bis(oxalato)borate (LiBOB). Alternatively, for instance, can be used additives such as cyclohexylbenzene, biphenyl and the like which are applicable in dealing with overcharges.

The production method for a lithium secondary battery is described next. The secondary battery production method comprises obtaining a positive electrode comprising a lithium transition metal composite oxide as a positive electrode active material and a negative electrode, and supplying a cyclic silazane-based compound to at least the negative electrode. In addition, the production method may include steps of, for instance, fabricating a positive electrode, fabricating a negative electrode, constructing a lithium secondary battery with the positive electrode and the negative electrode and so on. These can be carried out, however, by suitably applying the specifications described above and conventionally employed techniques. Thus, these are not discussed here in particular.

The production method disclosed herein comprises obtaining a positive electrode comprising a lithium transition metal composite oxide as a positive electrode active material and a negative electrode. The positive electrode and the negative electrode are as described above. Thus, their description is not repeated.

The production method disclosed herein comprises supplying a cyclic silazane-based compound to at least the negative electrode. By this, the cyclic silazane-based compound and/or a reaction product thereof may be present on and/or around the negative electrode and act to inhibit degradation of cycle characteristics caused by a transition metal dissolved out from the positive electrode. As the cyclic silazane-based compound, those described earlier can be preferably used. As long as the cyclic silazane-based compound is supplied to at least the negative electrode, it may be supplied to other battery components such as the positive electrode, etc. From the standpoint of efficiently obtaining greater cycle characteristics, it is particularly preferable to supply the cyclicsilazane-based compound to the negative electrode (in typical, locally to the negative electrode).

A suitable example of the supply method may include obtaining a non-aqueous electrolyte comprising the cyclic silazane-based compound, and supplying the non-aqueous electrolyte obtained to an electrode body comprising a positive electrode and a negative electrode. In typical, the cyclic silazane-based compound is added to the non-aqueous electrolyte, whereby the cyclic silazane-based compound is supplied to an electrode (typically to the negative electrode) through the non-aqueous electrolyte. By this, the cyclic silazane-based compound will be supplied to the electrode body (typically the negative electrode) from the non-aqueous electrolyte which can come in contact with the electrode body, whereby the cyclic silazane-based compound will preferably produce the effect of bringing about greater cycle characteristics.

The cyclic silazane-based compound content (amount added) in the non-aqueous electrolyte is not particularly limited. From the standpoint of obtaining sufficient effect of bringing about greater cycle characteristics, it is preferably 0.01% by mass or higher (e.g. 0.1% by mass or higher, typically 0.3% by mass or higher). From the standpoint of inhibiting degradation of battery properties (typically an increase in resistance) due to excessive addition, it is preferably 5% by mass or lower (e.g. 2% by mass or lower, typically 1% by mass or lower). When the cyclic silazane-based compound content (amount added) is too excessive, disadvantages of the excessive addition outscore the effect to bring about greater cycle characteristics, whereby a desirable effect tends not to be obtained.

The method for supplying the cyclic silazane-based compound is not limited to the inclusion in the non-aqueous electrolyte as described above. For example, the method may apply the cyclic silazane-based compound to the surfaces of the positive electrode and/or negative electrode (typically of the negative electrode). Preferable examples of such a method include a method where a solution or dispersion comprising the cyclic silazane-based compound dissolved or dispersed in water or an organic solvent is applied to the surface of an electrode (negative electrode) and allowed to dry as necessary. Alternatively, the cyclic silazane-based compound can be included in a composition for forming electrode material layer (preferably negative electrode material layer). In this case, the amount of the cyclic silazane-based compound used (added) is, based on non-volatiles, preferably 0.001 part by mass or more (e.g. 0.01 part by mass or more, typically 0.03 part by mass or more) relative to 100 parts by mass of the electrode material layer (typically the negative electrode material layer). From the standpoint of inhibiting degradation of battery properties due to excessive addition, it is preferably 5 parts by mass or less (e.g. 2 parts by mass or less, typically 1 part by mass or less).

It is preferable to construct the lithium secondary battery as a lithium secondary battery greater than the 4.2 V class. Herein, in this description, the term "lithium secondary battery greater than the 4.2 V class" refers to a lithium secondary battery using a positive electrode active material having a redox potential (operating voltage) including a range above 4.2 V (vs L/Li$^+$) in the 0% SOC to 100% SOC range. Such a secondary battery can be considered as a lithium secondary battery whose positive electrode's potential exceeds 4.2 V at least in a partial range between 0% SOC and 100% SOC. The effect by this invention to bring about greater cycle characteristics can be preferably produced in high-voltage charging and discharging. Thus, it is preferable to construct the lithium secondary battery as a 4.3 V or higher class (e.g. a 4.35 V or higher class, or even a 4.5 V or higher class) lithium secondary battery, or even as a 4.6 V or higher class (e.g. 4.8 V or higher class, or even a 4.9 V or higher class) lithium secondary battery.

Figure 6:
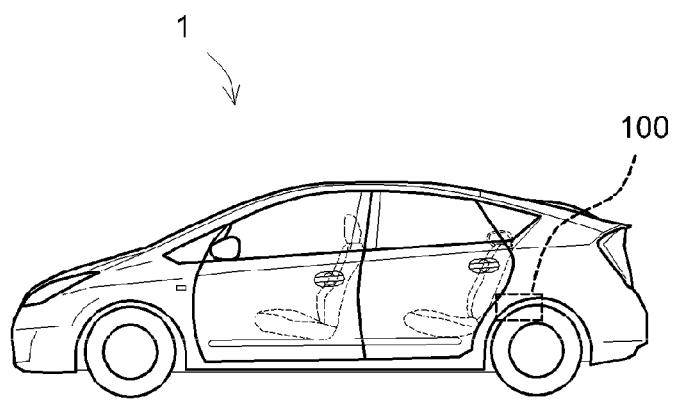
FIG. 6 shows a side view of a vehicle (automobile) comprising the lithium secondary battery according to an embodiment.

As described above, with the greater cycle characteristics, the lithium secondary battery in the art disclosed herein can be used as a secondary battery for various purposes. For example, as shown in FIG. 6, a lithium secondary battery 100 can be installed in a vehicle 1 such as an automobile, etc., and preferably used as a power supply for a drive source such as a motor and the like to drive the vehicle 1. Accordingly, the present invention can provide a vehicle (typically an automobile, particularly an automobile comprising an electric motor such as a hybrid automobile (HV), plug-in hybrid automobile (PHV), electric automobile (EV) and fuel cell automobile) 1 comprising, as its power source, the lithium secondary battery (typically a battery system comprising several series-connected batteries) 100.

Several worked examples relating to the present invention are described below, but the present invention is not intended to be limited to these examples. In the description below, "parts" and "%" are by mass unless otherwise specified.

EXAMPLE 1

[Fabrication of Positive Electrode]

With NMP, were mixed LiNi$_{0.5}$Mn$_{1.5}$O$_4$ powder (Ni—Mn spinel) as a positive electrode active material, acetylene black as a conductive material and PVdF as a binder at a mass ratio of these materials of 85:10:5 to prepare a paste-like positive electrode material layer-forming composition. The composition was evenly applied to one face of aluminum foil (15 µm thick) to a coating amount of 6.5 mg/cm$^2$ (based on non-volatiles). The coating was allowed to dry, pressed and cut out to a prescribed size (a circle of 14 mm diameter) to obtain a positive electrode.

[Fabrication of Negative Electrode]

With NMP, were mixed graphite powder as a negative electrode active material and PVdF as a binder at a mass ratio of these materials of 92.5:7.5 to prepare a paste-Eke negative electrode material layer-forming composition. The composition was evenly applied to one face of copper foil (15 µm thick) to a coating amount of 4.3 mg/cm$^2$ (based on non-volatiles). The coating was allowed to dry pressed and cut out to a prescribed size (a circle of 16 mm diameter) to obtain a negative electrode.

[Fabrication of Lithium Secondary Battery]

Figure 4:
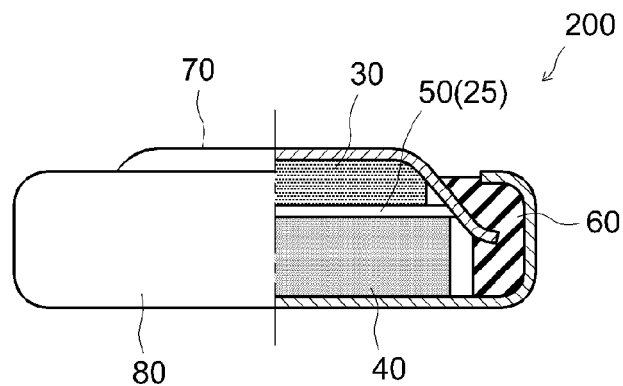
FIG. 4 shows a partial cross-sectional view illustrating a coin cell fabricated in a worked example.

Using the positive electrode and negative electrode fabricated as described above, was fabricated a 2032 coin cell 200 having an approximate constitution illustrated in FIG. 4. In particular, the positive electrode 30 and negative electrode 40 fabricated above were layered along with a separator 50 impregnated with a non-aqueous electrolyte solution 25. The resultant was placed in a container 80 (negative terminal) and the same electrolyte solution was further added in drops. Subsequently, container 80 was sealed with a gasket 60 and a lid 70 (positive terminal) to obtain the battery 200. As the separator, was used a 25 µm thick polypropylene porous film cut out to a prescribed size (a circle of 19 mm diameter). As the non-aqueous electrolyte solution, was used an electrolyte solution containing approximately 1 mol/L of LiPF$_6$ as a supporting salt dissolved in a 3:4:3 (volume ratio) solvent mixture of EC, EMC and DMC and further containing 0.5% 2,4,6-trimethyl-2,4,6-trivinylcyclotrisilazane (3VCSZ) as a cyclic silazane-based compound.

EXAMPLES 2 and 3

The 3VCSZ contents (amounts added) were modified as shown in Table 1. Otherwise, in the same manner as Example 1, coin cells according to Examples 2 and 3 were fabricated.

EXAMPLE 4

No 3VCSS was used. Otherwise, in the same manner as Example 1, a coin cell according to Example 4 was fabricated.

EXAMPLE 5

Octamethylcyclotetrasilazane was substituted for 3VCSZ. Otherwise, in the same manner as Examples 1, a coin cell according to Example 5 was fabricated.

[Capacity Retention Rate After 100 Cycles]

At a temperature of 25° C., each battery obtained above was subjected to 3 cycles of alternate charging at a 1/10 C rate to 4.1 V and discharging at the same rate to 3.0 V. Subsequently, in an environment at 60° C., it was subjected to 100 cycles of constant-current, constant-voltage (CCCV) charging (1 C rate, 0.15 C cut) to 4.9 V and constant-current (CC) discharging (1 C rate) to 3.5 V (cycle test). With the first cycle's discharge capacity (initial discharge capacity) being 100%, the retention rate (%) of discharge capacity after 100 cycles was determined. The results are shown in Table 1. With respect to Example 1 and Example 4, the relationships between capacity retention rate (%) and number of cycles are shown in FIG. 5.

TABLE 1

| | Additive | Amount of additive added (%) | Capacity retention rate after 100 cycles (%) |
|---|---|---|---|
| Ex. 1 | 3VCSZ | 0.5 | 52 |
| Ex. 2 | 3VCSZ | 0.1 | 44 |
| Ex. 3 | 3VCSZ | 1 | 48 |
| Ex. 4 | — | — | 40 |
| Ex. 5 | Octamethylcyclotrisilazane | 0.5 | 4 |

Figure 5:
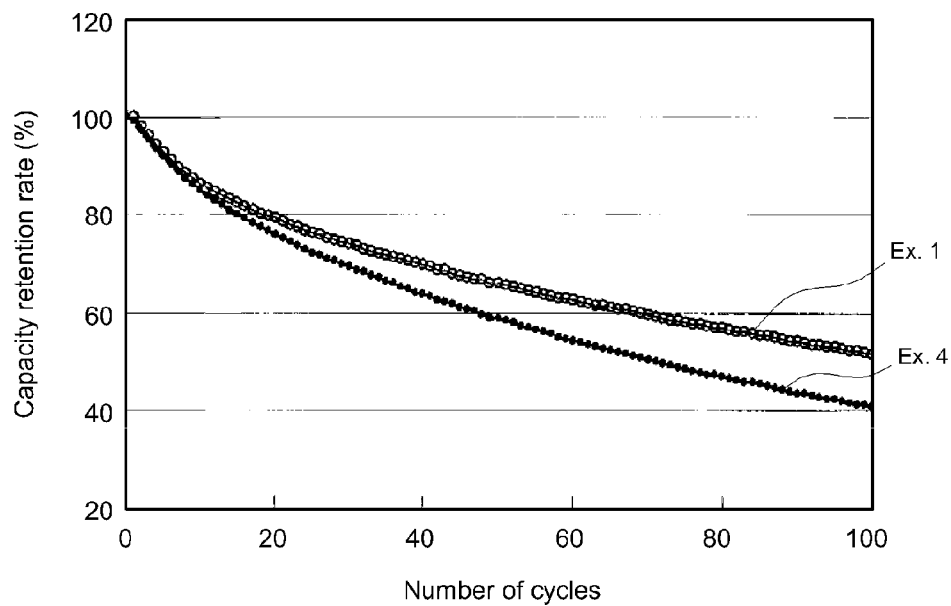
FIG. 5 shows a graph representing relationships between capacity retention rate and number of cycles in cycle test.

As shown in Table 1 and FIG. 5, with respect to the batteries according to Example 1 to Example 3 using a vinyl group-containing cyclic silazane-based compound as an additive, their capacity retention rates after 100 cycles were higher than that of the battery according to Example 4 not using the cyclic silazane-based compound. In Example 5, although a vinyl group-free cyclic silazane was used as an additive, the cycle characteristics degraded as compared to Example 4 using no additive. From these results, it is evident that the use of a vinyl group-containing cyclic silazane-based compound can bring about greater cycle characteristics. Presumably, the greater cycle characteristics were obtained by inhibition of lithium deactivation caused by a transition metal dissolved out from the positive electrode. Accordingly, it is anticipated that as long as the secondary battery is used under a condition where a transition metal is dissolved out from the positive electrode, regardless of the type of positive electrode active material, the effect of the present invention can be achieved. This is perceivable to a person ordinarily skilled in the art.

Although specific embodiments of the present invention have been described in detail above, these are merely for illustrations and do not limit the scope of the claims. The invention disclosed herein includes various modifications and changes made to the specific embodiments illustrated above.

REFERENCE SIGNS LIST

1 automobile (vehicle)
10 battery case
12 opening
14 lid
20 wound electrode body
25 non-aqueous electrolyte (non-aqueous electrolyte solution)
30 positive electrode (positive electrode sheet)
32 positive current collector
34 positive electrode material layer
35 positive current collector-overlapping portion
36 positive electrode material layer-free portion
37 inner positive terminal
38 outer positive terminal
40 negative electrode (negative electrode sheet)
42 negative current collector
44 negative electrode material layer
45 negative current collector-overlapping portion
46 negative electrode material layer-free portion
47 inner negative terminal
48 outer negative terminal
50, 50A, 50B separators (separator sheets)
100 lithium secondary battery

The invention claimed is:

1. A lithium secondary battery comprising:
a positive electrode comprising a lithium transition metal composite oxide as a positive electrode active material;
a negative electrode; and
a coating derived from a cyclic silazane-based compound, the coating being precipitated out on the surface of the negative electrode, wherein
the cyclic silazane-based compound comprises a Si—N bond in the ring constituting the cyclic silazane-based compound and also has at least one vinyl group.

2. The lithium secondary battery according to claim 1, wherein the cyclic silazane-based compound is a vinyl group-containing cyclic silazane represented by a formula (1):

[Chem 1]

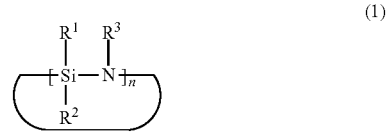

(1)

(in the formula (1), R1 and R2 are either the same or different with each being an organic group having 1 to 12 carbon atoms, and at least either R1 or R2 includes a vinyl group; R3 is a hydrogen atom or an organic group having 1 to 12 carbon atoms; and n is an integer between 2 and 10).

3. The lithium secondary battery according to claim 1, wherein the positive electrode active material has an upper operating voltage limit of 4.35 V or higher relative to lithium metal.

4. The lithium secondary battery according to claim 1, wherein the positive electrode active material is a spinel lithium transition metal composite oxide comprising Li and also Ni and Mn as transition metals.

5. A method for producing a lithium secondary battery, the method comprising:
obtaining a positive electrode comprising a lithium transition metal composite oxide as a positive electrode active material and a negative electrode,
obtaining a non-aqueous electrolyte comprising a cyclic silazane-based compound, and
supplying the non-aqueous electrolyte obtained to an electrode body comprising the positive electrode and the negative electrode, wherein
the cyclic silazane-based compound comprises a Si—N bond in the ring constituting the cyclic silazane-based compound and has at least one vinyl group.

6. The method according to claim 5, wherein the cyclic silazane-based compound is a vinyl group-containing cyclic silazane represented by a formula (1):

[Chem 2]

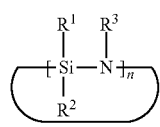

(1)

(in the formula (1), R1 and R2 are either the same or different with each being an organic group having 1 to 12 carbon atoms, and at least either R1 or R2 includes a vinyl group; R3 is a hydrogen atom or an organic group having 1 to 12 carbon atoms; and n is an integer between 2 and 10).

7. The method according to claim 5, wherein the positive electrode active material is a positive electrode active material having an upper operating voltage limit of 4.35 V or higher relative to lithium metal.

8. The method according to claim 5, wherein the positive electrode active material is a spinel lithium transition metal composite oxide comprising Li and also Ni and Mn as transition metals.

9. A vehicle equipped with the lithium secondary battery according to claim 1.

10. A lithium secondary battery comprising:
- a positive electrode comprising a lithium transition metal composite oxide as a positive electrode active material;
- a negative electrode; and
- an electrolyte comprising a cyclic silazane-based compound, wherein
- the cyclic silazane-based compound comprises a Si—N bond in the ring constituting the cyclic silazane-based compound and also has at least one vinyl group.

* * * * *